(12) United States Patent
Seo

(10) Patent No.: US 7,779,159 B2
(45) Date of Patent: Aug. 17, 2010

(54) APPARATUS AND METHOD FOR PROVIDING HIGH SPEED DOWNLOAD SERVICE OF MULTIMEDIA CONTENTS

(75) Inventor: Kwang Deok Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 1054 days.

(21) Appl. No.: 10/936,475

(22) Filed: Sep. 9, 2004

(65) Prior Publication Data

US 2005/0060386 A1  Mar. 17, 2005

(30) Foreign Application Priority Data

Sep. 17, 2003 (KR) .................. 10-2003-0064501

(51) Int. Cl.
*G06F 15/16* (2006.01)
*G09G 5/02* (2006.01)

(52) U.S. Cl. .......... 709/246; 345/600; 375/240.06; 375/240.12; 375/240.13; 375/240.14; 375/240.15; 375/240.16; 375/240.24; 375/240.25; 380/37; 382/232; 382/233; 382/244; 382/248; 382/305; 382/306

(58) Field of Classification Search .......... 382/232, 382/233, 244, 305–306, 248; 370/535; 380/37; 348/42; 375/240.12, 240.25, 240.08, 240.14, 375/240.15, 240.16, 240.24, 240.13, 240.06; 345/600, 686; 358/523, 524
See application file for complete search history.

(56) References Cited

U.S. PATENT DOCUMENTS

2003/0138043 A1* 7/2003 Hannuksela .......... 375/240.08
2003/0204519 A1* 10/2003 Sirivara et al. .............. 707/101
2003/0221014 A1* 11/2003 Kosiba et al. ............... 709/231
2004/0170394 A1* 9/2004 Kiyama et al. .............. 386/111
2006/0256130 A1* 11/2006 Gonzalez .................... 345/619

FOREIGN PATENT DOCUMENTS

| JP | 2003-224839 | | 8/2003 |
|---|---|---|---|
| JP | 2004-241793 | | 8/2004 |
| KR | 2001-0079083 | | 8/2001 |
| KR | 2002-0095001 | | 12/2002 |
| WO | WO 02/104016 | * | 12/2002 |
| WO | WO 03/052626 | * | 6/2003 |
| WO | WO 03/073768 | | 9/2003 |
| WO | WO 03/073768 A1 | | 9/2003 |

OTHER PUBLICATIONS

Japanese Office Action dated Apr. 18, 2007.
Toby Walker et al., "International Organisation for Standardisation", XP-001089885, May 2002.

* cited by examiner

Primary Examiner—Ashok B Patel
(74) Attorney, Agent, or Firm—KED & Associates LLP

(57) ABSTRACT

An apparatus for downloading a multimedia file including a file converter configured to convert a larger multimedia file into a smaller multimedia file by deleting prescribed medial information based on a media format contained in the larger file. Further, the file converter converts the larger file into the smaller file by deleting multi bit-rate media not corresponding to a selected bit rate or by deleting enhancement layer video.

12 Claims, 5 Drawing Sheets

APPARATUS AND METHOD FOR PROVIDING HIGH SPEED DOWNLOAD SERVICE OF MULTIMEDIA CONTENTS

CROSS-REFERENCE TO RELATED APPLICATION

This application is related to Korean Application No. 64501/2003, filed on Sep. 17, 2003, the entire contents of which are hereby incorporated in its entirety.

BACKGROUND OF THE INVENTION

1. Field of the Invention

The present invention relates to a VOD (Video on Demand) service, and more particularly to an apparatus and method for providing a high speed download service of multimedia contents capable of converting a format of a multimedia contents file used for a download service.

2. Background of the Related Art

A multimedia contents file for a VOD service may be created in an MP4 file format, for example, and constructed to effectively implement a streaming service. For example, FIG. 1 illustrates a structure of a general MP4 file format. As shown, the MP4 file is roughly divided into a 'moov' part corresponding to a header part and a 'mdat' part containing actual media information.

The 'moov' part includes a plurality of 'trak()' boxes holding meta information on each media according to a type of the media included in the multimedia contents file. That is, the trak boxes include a 'trak(video)' including meta information on video information, a 'trak(audio)' including meta information on audio information, and a 'trak(hint)' provided for a real time streaming service.

The multimedia contents file constructed with such a file format as shown in FIG. 1 is suitable for a streaming service. The VOD service provides the streaming service and a download service together based on the above-structured multimedia contents file.

In general, when creating a file suitable for the streaming service, functions making an internal structure of the file complicated are included to handle problems that may arise when the stream service is provided on a real time basis. A typical function is the construction of a multiple video trak by applying a temporal scalability. In more detail, FIG. 2 illustrates an example of a streaming service using a temporal scalability-based file format, in which the transmission of a base layer video and an enhancement layer video are controlled according to an available bandwidth of a network.

In other words, if an available bandwidth of the network is low, an RTP (Real Time Protocol) streaming server carries only the base layer video on an RTP packet, whereas if the available bandwidth of the network is higher than a prescribed value, the RTP streaming server transmits the enhancement layer video having a B (bi-directional)-frame as well as the base layer video so that a user can be provided with a video service with a high frame rate. In this instance, however, although the B-frame is advantageous in the aspect of the transmission error and scalability, it increases a transmission quantity.

Further, if the available bandwidth of the network is too low to transmit the base layer video, the RTP streaming server transmits only an I (intrinsic)-frame for service. However, in such a streaming service method, significant data is added to additionally store the enhancement layer video or the like, so that when the multimedia contents file is provided as a download service, the amount of data to be transmitted is significantly increased.

Further, because the number of packets required for transmission of the entire multimedia contents file is increased, the user's service fee is increased and a lot of time is required for the user to download the file for service.

Turning now to FIG. 3, which illustrates a format of the multimedia contents file including a multi bit-rate media. One multimedia contents file includes multi bit-rate coded video and audio data. The multimedia contents file as shown in FIG. 3 has a structure that can be serviced by selecting video and audio data suitable for the available bandwidth of the network such as the temporal scalability.

If the available bandwidth of the network is not less than 256 Kbps, a video V3 and an audio A3 are streaming-serviced, while if the available bandwidth is not more than 64 Kbps, quite low, a video V1 and an audio A1 are streaming-serviced.

However, even though the multimedia contents file having the structure including the multi bit-rate coded media is used for the download service, the number of packets required for transmission of the entire file is increased, which results in a higher service fee and increases a user's standby time for using the service.

SUMMARY OF THE INVENTION

Accordingly, one object of the invention is to address at least the above problems and/or disadvantages and to provide at least the advantages described hereinafter.

Another object of the present invention is to provide a download service that converts a file format suitable for a real time streaming service into a file format suitable for a download service.

To achieve at least the above objects in whole or in parts, the present invention provides a novel apparatus for downloading a multimedia file including a file converter configured to convert a larger multimedia file into a smaller multimedia file by deleting prescribed media information based on a media format contained in the larger file. Further, the file converter converts the larger file into the smaller file by deleting multi bit-rate media not corresponding to a selected bit rate or by deleting enhancement layer video.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION

An apparatus and method for providing a high speed download service of multimedia contents according to the present invention will now be described with reference to the accompanying drawings.

Figure 1:
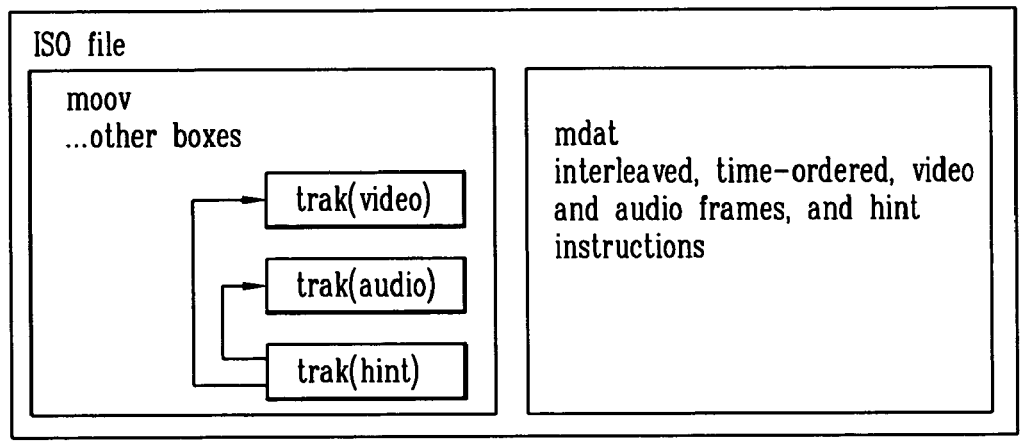
FIG. 1 is an overview illustrating a general MP4 file format.
Figure 2:
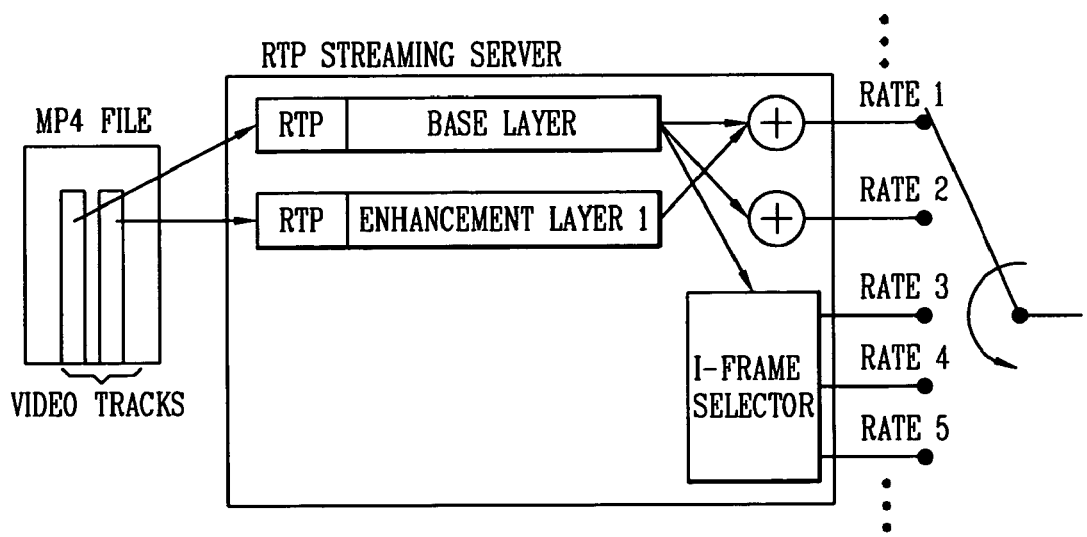
FIG. 2 is an overview illustrating a streaming service using a temporal scalability-based file format.
Figure 3:
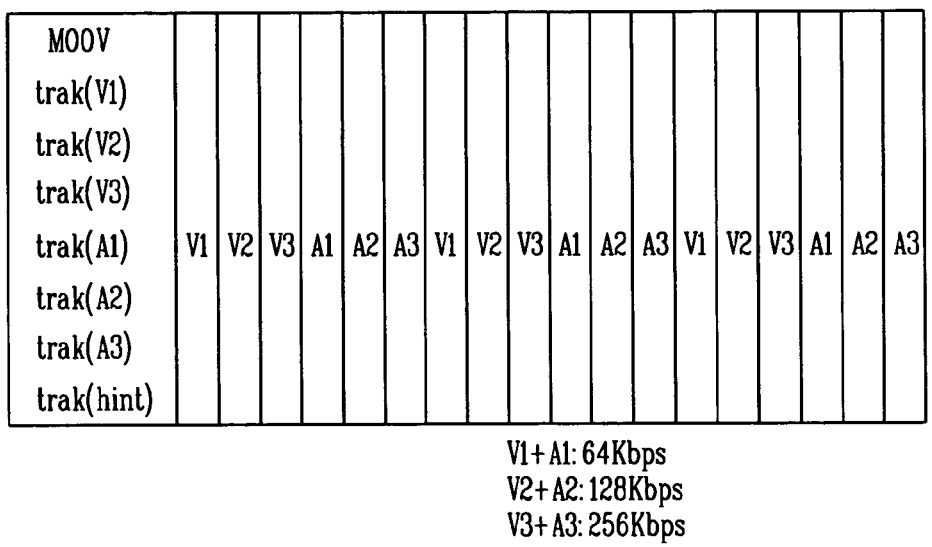
FIG. 3 is an overview illustrating a format of a multimedia contents file containing a multi bit-rate media.
Figure 4:
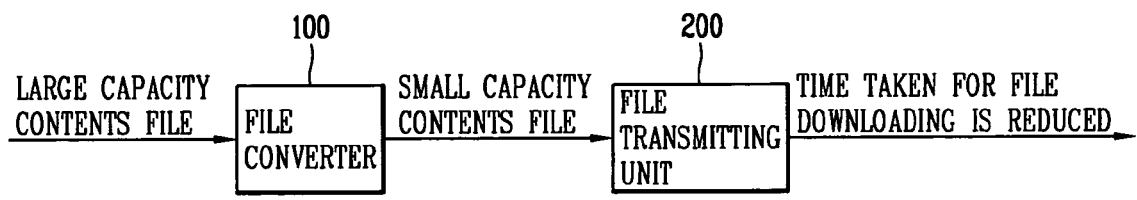
FIG. 4 is a block diagram illustrating a construction of an apparatus for providing a high speed download service of multimedia contents according to the present invention.

In more detail, FIG. 4 is a block diagram illustrating a construction of an apparatus for providing a high speed download service of multimedia contents according to the present invention. As shown in FIG. 4, the apparatus includes a file converter 100 for selectively deleting media information according to an internal attribute of a multimedia contents file for a streaming service, and for converting it into a multimedia contents file for a download service; and a file transmitting unit 200 for transmitting the multimedia contents file for the download service outputted from the file converter 100 to a terminal using Hyper Text Transfer Protocol (HTTP), for example.

The file converter 100 deletes certain types of media information to convert a large capacity multimedia contents file into a smaller file suitable for downloading. In this instance, the multimedia contents file for the download service maintains a same basic format of the multimedia contents file for streaming.

The apparatus for providing a high speed download service of multimedia contents for streaming operates as follows.

First, when a download service of an arbitrary large capacity multimedia contents is requested by a terminal, the file converter 100 determines an internal attribute of the corresponding multimedia contents. That is, the file converter 100 determines whether or not the multimedia contents contains an enhancement layer video or a multi bit-rate media.

If the multimedia contents contains enhancement layer video, the file converter deletes media information related to the enhancement layer video, while if the multimedia contents contains multi bit-rate media, the file converter deletes media information except for a bit rate selected by a user. Through this process, the file converter 100 converts a large file into a smaller file. The transmitting unit 200 then transmits the smaller file to a corresponding terminal.

Figure 5:
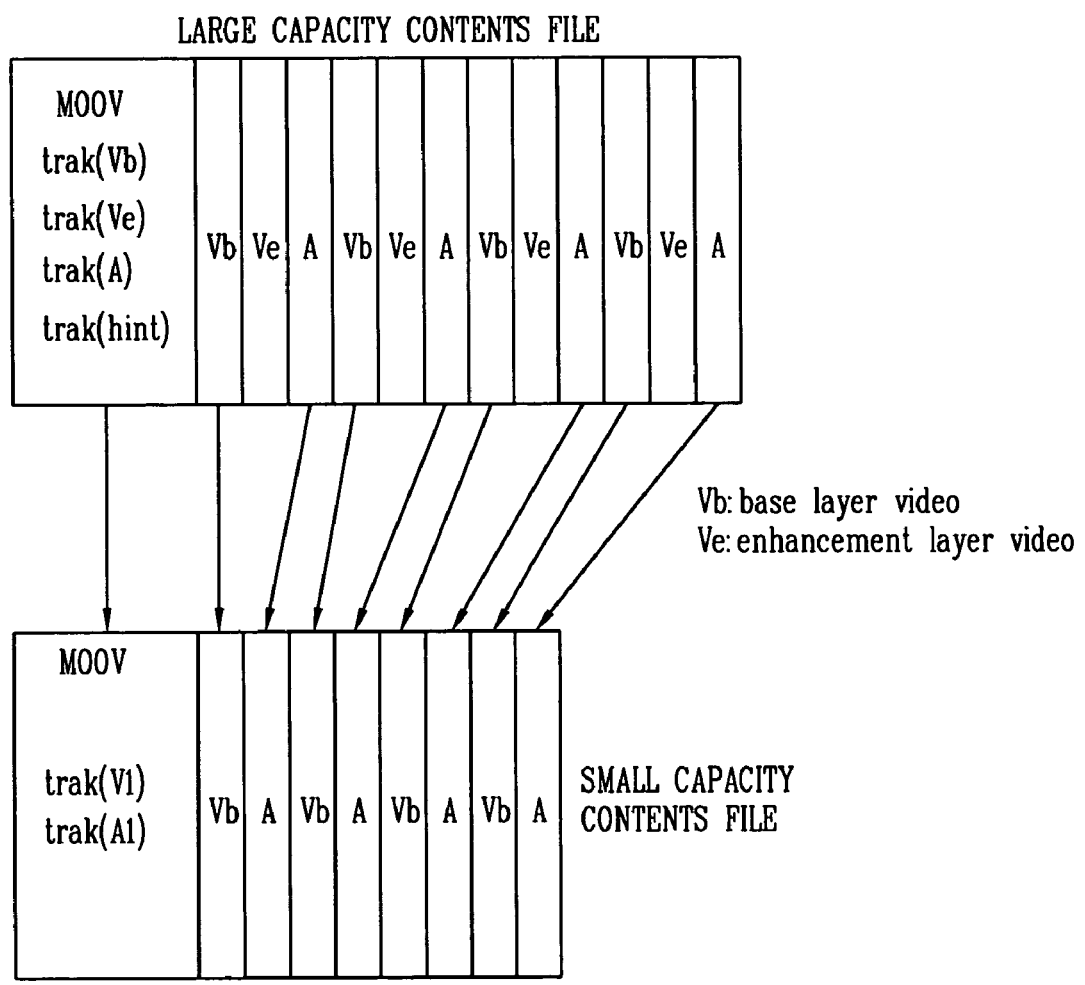
FIG. 5 is an overview illustrating the conversion of a large capacity multimedia contents file containing an enhancement layer video into a smaller capacity multimedia contents file.

Turning next to FIG. 5, which illustrates conversion of a large capacity multimedia contents file containing an enhancement layer video into a smaller file. As shown, the large capacity multimedia contents file includes a 'moov' part (a header part), and a 'mdat' part (a media data part). The 'mdat' part includes base layer and enhancement layer video.

When the large capacity multimedia contents file is inputted, the tracks of the 'moov' part and the media data of 'mdat' part related to the enhancement layer video are deleted to convert the large file into a smaller capacity multimedia file. In this instance, because the base layer video and the enhancement layer video are mutually independent content, the deletion can be performed without affecting the base layer video. Further, in the multimedia contents file, a spatial position value (chunk_offset) of the remaining non-deleted media data is adjusted, and if there is a hint track in the 'moov' part, the hint track is also deleted.

Figure 6:
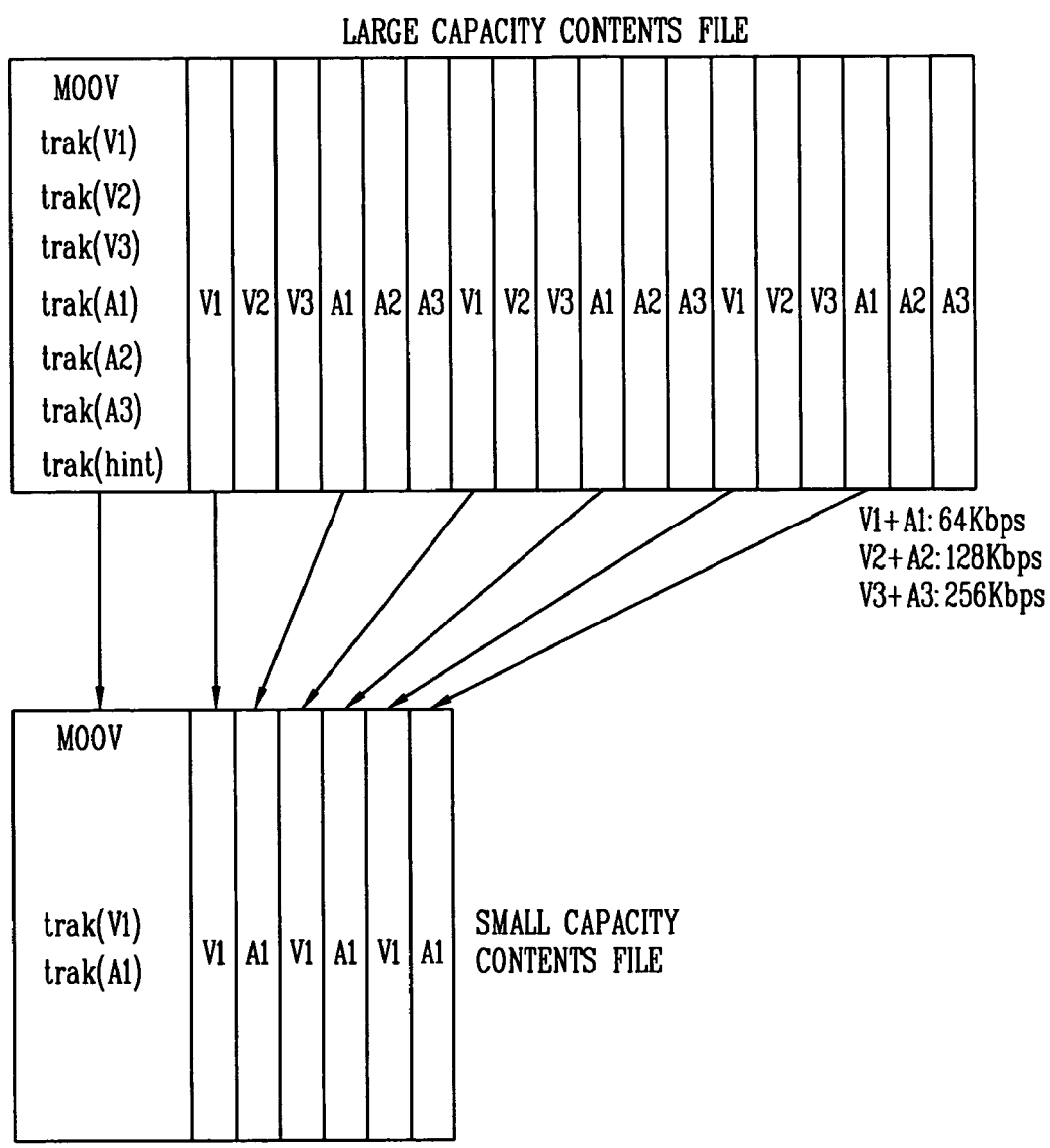
FIG. 6 is another overview illustrating the conversion of a large capacity multimedia contents file containing multi bit-rate media into a smaller capacity multimedia contents file.

Next, FIG. 6 illustrates conversion of a large capacity multimedia contents file containing multi bit-rate media into a smaller file supporting only a single bit rate of 64 Kbps, for example. As shown, when the large file is inputted, the track of the 'moov' part and the media data of 'mdat' part except for a bit rate selected by a user (e.g., 64 Kbps) are deleted to convert the large file into a smaller file.

In addition, a hint track of the 'moov' part is deleted because it includes information that is not required for the download service. Further the tracks V2, V3, A2 and A3 as well as the meta information of the media data are deleted from the 'moov' part because they include information independent from the tracks V1 and A1 for the 64 Kbps bit rate. Further, data in media data part other than 'V1' and 'A1' related to 64 Kbps are also deleted.

In addition, an alternate_group field value among fields of the track header box and header information of the tracks V1 and A1 is also converted. The alternate_group field is a value existing in every track, and is used to determine the media data contents.

For example, if the alternate_group values of two or more tracks are the same natural number, the two or more tracks are determined to be video tracks, which have the same content even though the tracks have different bit rates. If the alternate_group value is '0', each video track is determined to be a video track with a different content.

As shown in FIG. 6, because the multimedia contents file containing multi bit rates includes the same content of media data having three different types of bit rates of 64 Kbps, 128 Kbps and 256 Kbps, the alternate_group value is the natural number of the same value, not '0'.

However, when a large capacity multimedia file is converted into a small capacity multimedia contents having a single bit rate, because each media data has a different content, the alternate_group value should be '0'. Thus, the alternate_group value recorded in the header of the 'trak (V1)' and the alternate_group value recorded in the header of 'trak (A1)' are converted to '0'. Further, in the large capacity multimedia contents file, the chunk_offset value indicating the spatial position of the remaining media data which has not been deleted is adjusted.

As shown in FIGS. 5 and 6, the file converter 100 reduces the size of the file by converting the structure of the large capacity multimedia contents file suitable for the streaming service, thereby shortening the time required for downloading the file.

Figure 7:
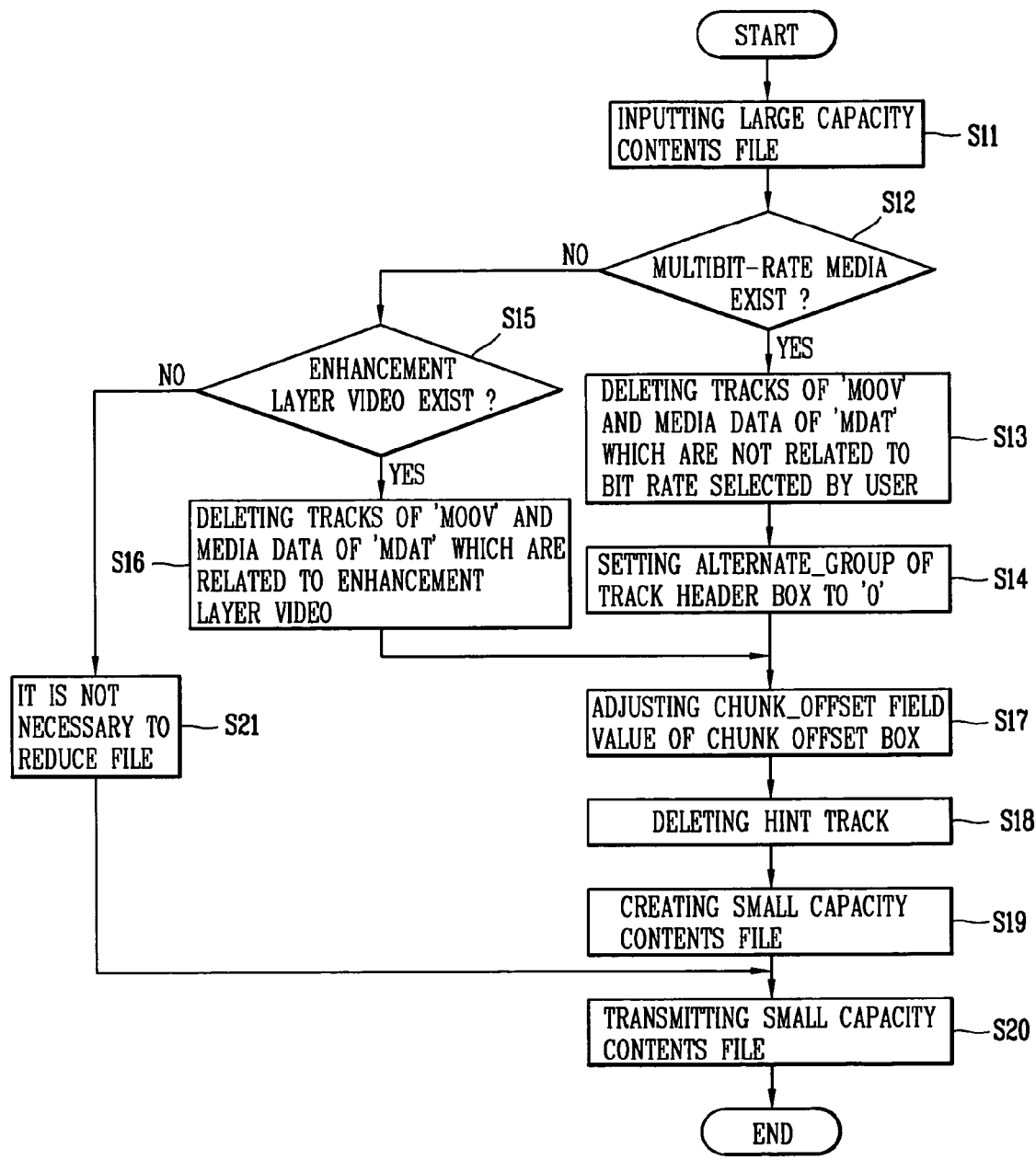
FIG. 7 is a flow chart illustrating a high speed download service of multimedia contents according to the present invention.

Turning now to FIG. 7, which is a flow chart illustrating a method for providing a high speed download service of multimedia contents according to the present invention. As shown, when the user requests a download service of an arbitrary multimedia contents file (step S11), the file converter 100 determines whether there is a multi bit-rate media in the file (step S12). Note, the original multimedia file is a large file having a complicated internal structure suitable for the streaming.

If there is multi bit-rate media in the file (yes in step S12), the tracks of 'moov' part and the media data of 'mdat' part, which have no relation to the bit rate selected by the user are deleted (step S13). Further, the alternate_group value of the track header box of the 'moov' part is set to '0' (step S14). That is, if there is a multi bit-rate media in the file, the alternate_group value of the track header box is the same natural number, not '0', but when the file is reduced to a file of a single bit rate, the alternate_group value is set to '0' so that each media data signifies a different content.

If there is no multi bit-rate media in the file (no in step S12), a determination is made as to whether or not there is enhancement layer video in the multimedia file (step S15). If there is enhancement layer video (yes in step S15), the tracks of the 'moov' part and the media data of the 'mdat' part related to the enhancement layer video are deleted (step S16). Note, the multimedia contents file includes the base layer video and the enhancement layer video, each having a different content.

After the file is reduced to the single bit rate or after the media information related to the enhancement layer video is deleted, a chunk_offset value indicating a spatial position of the remaining non-deleted media data is adjusted (step S17). Next, any hint tracks related to the streaming service are deleted (step S18), thereby creating a small capacity contents file suitable for downloading (step S19). The small capacity multimedia contents file is then transmitted to the terminal which has requested for the downloading service (step S20).

Further, if there is no multi bit-rate media and the enhancement layer video in the original larger file (no is steps S12 and S13), the original file is not reduced (stepS21) and transmitted as the original file (step S20).

As so far described, the apparatus and method for providing a high speed download service of multimedia contents of the present invention have the following advantages.

Because the large capacity multimedia file for streaming is converted into a smaller file, the time required for downloading the file is reduced, and the standby time for using the service is reduced. Further, because the file is reduced in size, the user's cost of the VOD is reduced.

This invention may be conveniently implemented using a conventional general purpose digital computer or microprocessor programmed according to the teachings of the present specification, as well be apparent to those skilled in the computer art. Appropriate software coding can readily be prepared by skilled programmers based on the teachings of the present disclosure, as will be apparent to those skilled in the software art.

The invention may also be implemented by the preparation of application specific integrated circuits or by interconnecting an appropriate network of conventional component circuits, as will be readily apparent to those skilled in the art. The present invention includes a computer program product which is a storage medium including instructions which can be used to program a computer to perform a process of the invention. The storage medium can include, but is not limited to, any type of disk including floppy disks, optical discs, CD-ROMs, and magneto-optical disks, ROMs, RAMs, EPROMs, EEPROMs, magnetic or optical cards, or any type of media suitable for storing electronic instructions.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art.

What is claimed is:

1. An apparatus for downloading a multimedia file, comprising:
a file converter to convert a larger multimedia file into a smaller multimedia file in response to a request for download service of media content at a selected bit rate, wherein the larger file includes multiple tracks of same media content at different bit rates including the selected bit rate, wherein media data of the same media content for one track is interleaved with media data of the same media content for one or more other tracks in the larger multimedia file, and wherein the file converter performs said conversion by:
selectively deleting meta information relating to one or more unselected bit rates in a header portion of the larger file, and
selectively deleting the interleaved media data relating to the one or more unselected bit rates in an mdat portion of the larger file, said method further comprising:
changing media content indicator values in headers of remaining non-deleted media data, corresponding to the media content at the selected bit rate, from one or more first values to a same second value, said same second value providing an indication that at least adjacent ones of the non-deleted media data include different media content, and
adjusting a spatial position value of the remaining non-deleted media data that corresponds to the media content at the selected bit rate in an mdat portion of the larger multimedia file, the spatial position value being adjusted to place the previously interleaved non-deleted media data into contiguous positions in the smaller multimedia file based on the selective deletion of the media data relating to the one or more unselected bit rates,
wherein the file converter is coupled to a transmitter for transmitting the smaller multimedia file to a terminal.

2. The apparatus of claim 1, wherein the media data relating to the one or more unselected bit rates is deleted by:
comparing information in alternate_group fields of tracks included in the larger file; and
deleting tracks corresponding to the one or more unselected bit rates that have same information in the alternate_group fields as tracks relating to the selected bit rate.

3. The apparatus of claim 1, wherein said selective deletion is performed so that the smaller file includes meta information and media data relating only to the selected bit rate, the smaller file being transmitted through a streaming service.

4. The apparatus of claim 1, wherein the one or more first values are a same value different from said same second value.

5. A method for downloading a multimedia file, comprising:
converting a larger multimedia file into a smaller multimedia file in response to a request for download service of media content at a selected bit rate, wherein the larger file includes multiple tracks of same media content at different bit rates including the selected bit rate, wherein media data of the same media content for one track is interleaved with media data of the same media content for one or more other tracks in the larger multimedia file, and wherein said converting includes deleting tracks corresponding to one or more unselected bit rates, said deleting comprising:
selectively deleting meta information relating to one or more unselected bit rates in a header portion of the larger file, and
selectively deleting the interleaved media data relating to the one or more unselected bit rates in an mdat portion of the larger file, said converting further comprising:
changing media content indicator values in headers of remaining non- deleted tracks, corresponding to the selected bit rate, from one or more first values to a same second value, said same second value providing an indication that at least adjacent ones of the non-deleted tracks include different media content, and adjusting a spatial position value of media data corresponding to the remaining non-deleted tracks that correspond to the selected bit rate in an mdat portion of the larger multimedia file, the spatial position value being adjusted to place the previously interleaved non-deleted media data into contiguous positions in the smaller multimedia file based on the selective deletion of the tracks including the media data relating to the one or more unselected bit rates, wherein a transmitter is transmitting the smaller multimedia file to a terminal.

6. The method of claim 5, further comprising:
determining whether the larger file includes multi bit-rate media.

7. The method of claim 5, wherein converting the larger file into the smaller file, comprises: deleting all tracks of 'moov' part and media data of the 'mdat' part that do not relate to the selected bit rate.

8. The method of claim 5, further comprising:
adjusting a track header box value for the deleted media information.

9. The method of claim 8, wherein changing the media content values in headers of remaining non-deleted media data includes changing alternate group values to said same second value.

10. The method of claim 5, wherein said selective deletion is performed so that the smaller file includes tracks corresponding to meta information and media data relating only to the selected bit rate, the smaller file being transmitted through a streaming service.

11. The method of claim 5, wherein the one or more first values are a same value different from said same second value.

12. A method for downloading a multimedia file, comprising:

receiving a request to download a multimedia file at a first bit rate;

deleting tracks in the multimedia file encoded at a second bit rate;

generating a smaller size multimedia file based on remaining tracks at the first bit rate, said generating including:

(a) changing media content indicator values in headers of the remaining tracks encoded at the first bit rate from one or more first values to a same second value, said same second value providing an indication that at least adjacent ones of the remaining tracks include different media content, and (b) adjusting spatial position values of the remaining tracks, the spatial position values adjusted to place the remaining tracks into contiguous positions based on deletion of the tracks corresponding to the second bit rate; and transmitting the smaller size multimedia file in response to the request, wherein a transmitter is transmitting the smaller size multimedia file to a terminal.

* * * * *